US009172761B2

(12) United States Patent
McCullough

(10) Patent No.: US 9,172,761 B2
(45) Date of Patent: *Oct. 27, 2015

(54) METHOD OF GATHERING INFORMATION RELATED TO ACTIVITY OF A USER AND A DATA PROCESSING SYSTEM PROGRAM PRODUCT

(75) Inventor: Sean M. McCullough, Austin, TX (US)

(73) Assignee: Open Text S.A., Luxembourg (LU)

( * ) Notice: Subject to any disclaimer, the term of this patent is extended or adjusted under 35 U.S.C. 154(b) by 415 days.

This patent is subject to a terminal disclaimer.

(21) Appl. No.: 12/902,735

(22) Filed: Oct. 12, 2010

(65) Prior Publication Data

US 2011/0029663 A1 Feb. 3, 2011

Related U.S. Application Data

(63) Continuation of application No. 11/137,723, filed on May 25, 2005, now Pat. No. 7,831,706, which is a continuation of application No. 09/752,184, filed on Dec. 29, 2000, now Pat. No. 6,996,612.

(60) Provisional application No. 60/173,831, filed on Dec. 30, 1999.

(51) Int. Cl.
*G06F 15/177* (2006.01)
*H04L 29/08* (2006.01)

(52) U.S. Cl.
CPC .............. *H04L 67/22* (2013.01); *H04L 67/36* (2013.01)

(58) Field of Classification Search
CPC .............................. H04L 67/22; H04L 67/36
USPC ................................................. 709/224, 223
See application file for complete search history.

(56) References Cited

U.S. PATENT DOCUMENTS

| 4,754,428 A | 6/1988 | Schultz et al. |
| 4,811,207 A | 3/1989 | Hikita et al. |
| 5,210,824 A | 5/1993 | Putz et al. |
| 5,212,787 A | 5/1993 | Baker et al. |
| 5,226,161 A | 7/1993 | Khoyi et al. |
| 5,257,369 A | 10/1993 | Skeen et al. |
| 5,312,787 A | 5/1994 | Uchida et al. |
| 5,331,673 A | 7/1994 | Elko et al. |
| 5,339,392 A | 8/1994 | Risberg et al. |
| 5,421,015 A | 5/1995 | Khoyi et al. |

(Continued)

OTHER PUBLICATIONS

Cabena, Peter et al., Intelligent Miner for Data Applications Guide, IBM RedBook SG24-5252-00, Mar. 1999.

(Continued)

*Primary Examiner* — Kenneth R Coulter
(74) *Attorney, Agent, or Firm* — Sprinkle IP Law Group

(57) ABSTRACT

Information related to activity of a user may be provided using a method or a data processing system program product to perform the method. In one embodiment, the method includes sending a first view request to a first electronic site, receiving a first view from the first electronic site, and first information related to the first view request to a second entity that is different from the first entity. In another embodiment, a data processing system program product may perform a method of sending information related to a view request from the user for an electronic site. The information is to be sent to an entity that is different from an entity that substantially controls or owns the electronic site and different from an Internet service provider of the user, if the user is to use the Internet service provider in accessing the electronic site.

27 Claims, 3 Drawing Sheets

(56) References Cited

U.S. PATENT DOCUMENTS

| | | |
|---|---|---|
| 5,557,717 A | 9/1996 | Wayner |
| 5,572,643 A | 11/1996 | Judson |
| 5,704,017 A | 12/1997 | Heckerman et al. |
| 5,727,129 A | 3/1998 | Barrett et al. |
| 5,732,218 A | 3/1998 | Bland et al. |
| 5,740,430 A | 4/1998 | Rosenberg et al. |
| 5,761,416 A | 6/1998 | Mandal et al. |
| 5,774,660 A | 6/1998 | Brendel et al. |
| 5,790,426 A | 8/1998 | Robinson |
| 5,790,790 A | 8/1998 | Smith et al. |
| 5,796,952 A * | 8/1998 | Davis et al. .......... 709/224 |
| 5,870,559 A | 2/1999 | Leshem et al. |
| 5,878,223 A | 3/1999 | Becker et al. |
| 5,884,282 A | 3/1999 | Robinson |
| 5,918,014 A | 6/1999 | Robinson |
| 5,958,008 A | 9/1999 | Pogrebisky et al. |
| 5,960,411 A | 9/1999 | Hartman et al. |
| 5,999,908 A | 12/1999 | Abelow |
| 6,012,052 A | 1/2000 | Altschuler et al. |
| 6,041,311 A | 3/2000 | Chislenko et al. |
| 6,041,335 A | 3/2000 | Merritt et al. |
| 6,049,777 A | 4/2000 | Sheena et al. |
| 6,067,565 A | 5/2000 | Horvitz |
| 6,073,241 A * | 6/2000 | Rosenberg et al. ........ 726/3 |
| 6,085,226 A | 7/2000 | Horvitz |
| 6,092,049 A | 7/2000 | Chislenko et al. |
| 6,094,662 A | 7/2000 | Hawes |
| 6,112,186 A | 8/2000 | Bergh et al. |
| 6,112,240 A * | 8/2000 | Pogue et al. .......... 709/224 |
| 6,112,279 A | 8/2000 | Wang |
| 6,119,103 A | 9/2000 | Basch et al. |
| 6,128,655 A | 10/2000 | Fields et al. |
| 6,138,141 A | 10/2000 | DeSimone et al. |
| 6,138,155 A * | 10/2000 | Davis et al. .......... 709/224 |
| 6,141,737 A | 10/2000 | Krantz et al. |
| 6,144,962 A | 11/2000 | Weinberg et al. |
| 6,185,586 B1 | 2/2001 | Judson |
| 6,185,608 B1 | 2/2001 | Hon et al. |
| 6,185,614 B1 | 2/2001 | Cuomo et al. |
| 6,199,099 B1 | 3/2001 | Gershman et al. |
| 6,205,472 B1 | 3/2001 | Gilmour |
| 6,285,987 B1 | 9/2001 | Roth et al. |
| 6,304,904 B1 | 10/2001 | Sathyanarayan et al. |
| 6,308,203 B1 | 10/2001 | Itabashi et al. |
| 6,321,206 B1 | 11/2001 | Honarvar |
| 6,321,256 B1 | 11/2001 | Himmel et al. |
| 6,393,479 B1 | 5/2002 | Glommen |
| 6,430,539 B1 | 8/2002 | Lazarus et al. |
| 6,446,261 B1 | 9/2002 | Rosser |
| 6,449,604 B1 | 9/2002 | Hansen et al. |
| 6,456,305 B1 | 9/2002 | Qureshi et al. |
| 6,460,079 B1 * | 10/2002 | Blumenau .......... 709/223 |
| 6,509,898 B2 | 1/2003 | Chi et al. |
| 6,559,882 B1 | 5/2003 | Kerchner |
| 6,581,072 B1 | 6/2003 | Mathur et al. |
| 6,606,657 B1 | 8/2003 | Zilberstein et al. |
| 6,629,136 B1 | 9/2003 | Naidoo |
| 6,640,215 B1 | 10/2003 | Galperin et al. |
| 6,643,696 B2 * | 11/2003 | Davis et al. .......... 709/224 |
| 6,654,804 B1 | 11/2003 | Fleming, III |
| 6,701,363 B1 | 3/2004 | Chiu et al. |
| 6,732,331 B1 | 5/2004 | Alexander |
| 6,745,367 B1 * | 6/2004 | Bates et al. .......... 709/224 |
| 6,757,740 B1 | 6/2004 | Parekh et al. |
| 6,771,290 B1 | 8/2004 | Hoyle |
| 6,836,799 B1 * | 12/2004 | Philyaw et al. .......... 709/224 |
| 6,839,682 B1 | 1/2005 | Blume et al. |
| 6,996,612 B1 * | 2/2006 | McCullough .......... 709/224 |
| 7,155,506 B1 | 12/2006 | McCullough |
| 7,502,994 B2 | 3/2009 | Kocol |
| 7,831,706 B1 * | 11/2010 | McCullough .......... 709/224 |
| 7,966,259 B1 * | 6/2011 | Bui .................. 705/50 |
| 8,612,891 B2 | 12/2013 | Singh et al. |
| 2001/0037321 A1 | 11/2001 | Fishman et al. |
| 2002/0026519 A1 | 2/2002 | Itabashi et al. |
| 2002/0099812 A1 * | 7/2002 | Davis et al. .......... 709/224 |
| 2003/0188263 A1 | 10/2003 | Bates |
| 2006/0123105 A1 | 6/2006 | Parekh et al. |
| 2009/0063656 A1 | 3/2009 | Blumenau et al. |
| 2009/0172159 A1 | 7/2009 | Kocol |

OTHER PUBLICATIONS

Datasage.com News and Events—DataSage Releases netCustomer, the 1st Individualization Solution for E-Commerce, retrieved Feb. 16, 2005 from Archive.org , 3 pgs.

Datasage.com—Executive Overview—Retail, Retail Data Mining Executive Overview, retrieved Feb. 16, 2005 from Archive.org, 7 pgs.

Gallant, Steve et al., Successful Customer Relationship Management in Financial Applications (Tutorial PM-1), Conference on Knowledge Discovery in Data, ISBN:1-58113-305-7, pp. 165-241.

Vignette Corporation to Acquire DataSage, Inc., retrieved from Archive.org Feb. 16, 2005, 3 pgs.

Chapman, Pete et al., CRISP-DM 1.0—Step-by-step data mining guide, retrieved from www.crisp-dm.org Feb. 17, 2005, pp. 1-78.

Kitts, "An Evaluation of Customer Retention and Revenue Forecasting in the Retail Sector: Investigation into the effects of Seasonality, Spending an Method" by DataSage, Inc., Oct. 25, 1999. 63 pages.

Kitts, "RMS Revenue and Retention Forecasting Final Phase Model Specification" by DataSage, Inc., Jan. 31, 2000, 16 pages.

Discount Store News, "Datasage Customer Analyst," 1998.

Montgomery, et al., "Estimating Price Elasticities with Theory-Based Priors," J. Marketing Research, vol. 36, pp. 413-423, 1999.

Simon, "Price Management," Elsevier Sci Pub, pp. 13-41, 1989.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, "Tackling Technology," Progressive Grocer, 1999.

Wellman, "Down in the (Data) Mines," Supermarket Business, pp. 33-35, 1999.

RT News, "New Customer Management System Returns Lost Sales to Dick's," RT Magazine, 1999.

DataSage, Inc., "DataSage Customer Analyst," Progressive Grocer, 1998.

Miller, M., "Applications Integration-Getting It Together," PC Magazine, Feb. 8, 1994, pp. 111-112, 116-120, 136, 138.

PointCast 2.0 Eases Burden on Network, 3 pp., Jun. 2, 1997.

Strom, David, The Best of Push, 7 pp., Apr. 1997.

When Shove Cannes to Push, 7 pp., Feb. 10, 1997.

thirdvoice.com—Home Page and Frequently Asked Questions (7 pages), www.thirdvoice.com, www.thirdvoice.com/help.20/faq.htm, 2000.

Office Action issued in U.S. Appl. No. 09/752,184, mailed Mar. 26, 2004.

Office Action issued in U.S. Appl. No. 09/752,184, mailed Oct. 8, 2004.

Office Action issued in U.S. Appl. No. 11/137,723, mailed Oct. 3, 2006.

Office Action issued in U.S. Appl. No. 11/137,723, mailed Feb. 6, 2008.

Office Action issued in U.S. Appl. No. 11/137,723, mailed Aug. 20, 2008.

Office Action issued in U.S. Appl. No. 11/137,723, mailed Dec. 12, 2008.

Office Action issued in U.S. Appl. No. 11/137,723, mailed Jul. 8, 2009.

Office Action issued in U.S. Appl. No. 11/137,723, mailed Dec. 23, 2009.

* cited by examiner

METHOD OF GATHERING INFORMATION RELATED TO ACTIVITY OF A USER AND A DATA PROCESSING SYSTEM PROGRAM PRODUCT

CROSS-REFERENCE TO RELATED APPLICATIONS

This application is a continuation of U.S. patent application Ser. No. 11/137,723, filed May 25, 2005, now U.S. Pat. No. 7,831,706, by Inventor Sean M. McCullough entitled "Method of Gathering Information Related to Activity of a User and a Data Processing System Program Product" which is a continuation of U.S. patent application Ser. No. 09/752,184, now U.S. Pat. No. 6,996,612, by inventor Sean M. McCullough entitled "Method of Providing Information Related to Activity of a User and a Data Processing System Program" filed on Dec. 29, 2000, which in turn claims priority under 35 U.S.C. §119(e) to U.S. Patent Application No. 60/173,831 entitled "Method for Controlling Web Usage Patterns Via Third-Party Annotation Services" by McCullough filed Dec. 30, 1999, which is incorporated by reference.

FIELD OF THE INVENTION

This invention relates in general to methods and data processing system program products, and more particularly, to methods and data processing system program products related to activity of a user at one or more electronic sites.

RELATED ART

The Internet allows the access of information by a wide variety of users. FIG. 1 includes an illustration of a system for a user 12 to access an electronic site 16 via an electronic site access provider (ESAP) 14. Each of the user 12 and electronic site 16 are bi-directionally coupled to the ESAP 14. Many times, the electronic site 16 can be an Internet site, and the ESAP 14 can be an Internet service provider. Typically, the user 12 makes a request for a view (e.g., a page) to the electronic site 16 via the ESAP 14. The protocol for the request is usually in hypertext transfer protocol (HTTP).

One of the challenges of the Internet has been for an entities that substantially control or own the electronic sites, such as electronic site 16, to obtain reliable information about users including user 12. While the entities may have information regarding activities of the users at their respective electronic sites, this information is typically sparse and gives only a small part of the profiles of the users.

Another attempt to get more information about users is for the entities that substantially control or own the electronic sites to form an alliance with one another to collect and share information about users at their respective electronic sites. Typically, the alliances cover a relatively small fraction of all electronic sites. To the extent users are accessing electronic sites outside the alliance, the members of the alliance do not have access to that information. Therefore, the profiles of the users include just a small portion of information regarding activities of the users.

ESAP 14 typically collects information regarding activities of its users with respect to electronic sites. However, the ESAP 14 may use the information for limited purposes, such as determining if the ESAP 14 needs additional servers, activity of one user is significantly more than all other users, and the like. Due to privacy concerns or policy considerations of the ESAP 14, it typically does not share all information that it collects regarding its subscribers' (users') activities with the entities that substantially control or own the electronic sites for the specific purpose of creating profiles of the ESAP's subscribers.

SUMMARY OF THE INVENTION

Information related to activity of a user may be provided using a method or a data processing system program product. The data processing system program product has a code embodied within a data processing system readable medium, and the code includes a set of instructions executable by a data processing system to perform the method. In one embodiment, the method includes an act of sending a first view request to a first electronic site. The electronic site is typically substantially controlled or owned by a first entity. The method further includes receiving a first view from the first electronic site. The first view substantially corresponds to the first view request. The method also includes sending first information related to the first view request to a second entity that is different from the first entity. In a specific implementation of the embodiment, the acts of sending the first view request, receiving, and sending the first information are performed by the user.

In another embodiment, a data processing system program product has a code embodied within a data processing system readable medium. The code comprises instructions executable by a data processing system of a user to perform a method of sending information related to a view request from the user for an electronic site. The information is to be sent to an entity that is different from an entity that substantially controls or owns the electronic site and is different from an Internet service provider or electronic site access provider of the user, if the user is to use such provider in accessing the electronic site.

BRIEF DESCRIPTION OF THE DRAWINGS

The present invention is illustrated by way of example and not limitation in the accompanying figures, in which like references indicate same elements, and in which.

Skilled artisans appreciate that elements in the figures are illustrated for simplicity and clarity and have not necessarily been drawn to scale. For example, the dimensions of some of the elements in the figure may be exaggerated relative to other elements to help to improve understanding of embodiments of the present invention.

DETAILED DESCRIPTION

Embodiments of the present invention allow information to be gathered regarding a user, where the information is more accurate than data collected at an individual electronic site or by an alliance of different entities having their own electronic sites because information regarding the user's activities outside individual electronic site and the alliance is collected. In one embodiment, the user sends a view request to an electronic site and also sends information related to the view request to a user information system that includes a data base of the user's activities at electronic sites. In one embodiment, the user may be able to enable or disable the information collection. The present invention is defined in the appended claims and is better understood after reading the descriptions of the embodiments that follow.

Before describing the embodiments in more detail, some terms are defined or clarified to improve understanding. "Electronic site" includes any site where information is sent to and received from an electronic communication device, such as a computer, mobile phone, personal digital assistant, or the like. A web site is an example of a common type of electronic site. "Entity" is any individual, partnership, company, corporation, or organization.

Figure 1:
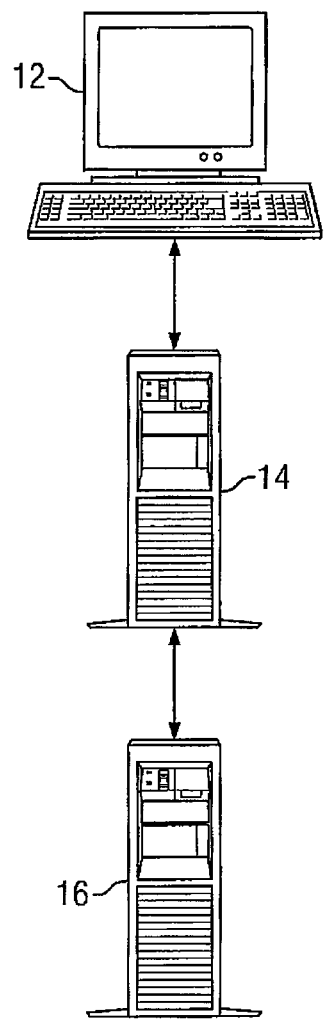
FIG. 1 includes an illustration of relationships between a user, ESAP, and electronic site when accessing information from the electronic site (prior art)
Figure 2:
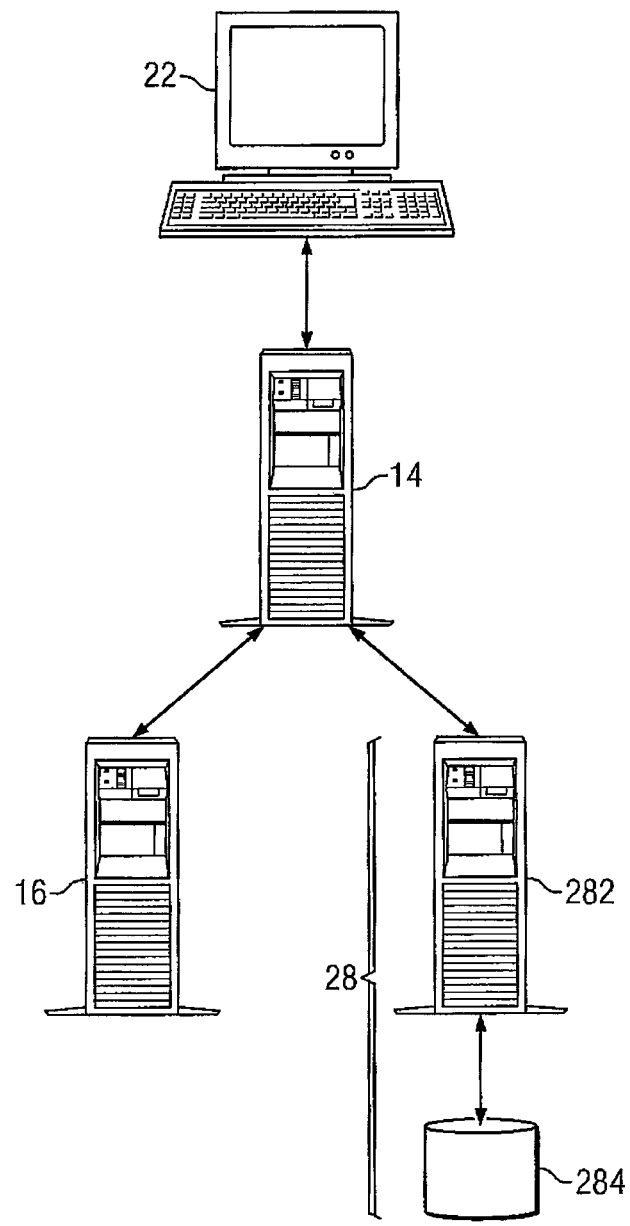
FIG. 2 includes an illustration of a system that allows information from a user to be recorded as he or she makes view requests from an electronic site via an ESAP.

FIG. 2 includes an illustration of a system that allows information from a user to be recorded in accordance with an embodiment of the present invention. Each of the user 22 and electronic site 16 are bi-directionally coupled to the ESAP 14. Although the user 22 is illustrated as being a personal computer, the user 22 is typically an individual who may potentially purchase a product or service from at the electronic site 16. The user 22 can access electronic sites using the personal computer, a personal digital assistant, a mobile phone, or the like. All of these devices typically include a data processing system (computer, microprocessor, microcontroller, or the like). The ESAP 14 and electronic site 16 are illustrated as servers, which are another type of data processing system. In this particular embodiment, the user 22, ESAP 14, and electronic site 16 are connected via the Internet. Although not shown, additional servers, switches, routers, combinations thereof, or the like may lie between the ESAP 14 and the electronic site 16 but are not shown in FIG. 2.

The ESAP 14 is also bi-directionally coupled to a user information system 28 that includes a server 282 and a database 284, which is that is bi-directionally coupled to the server 282. The database 284 may be part of or separate from the server 282. In still other embodiments, the database 284 may be coupled to the ESAP 14 without an intervening data processing system. The balance of the description of the embodiments are described with respect to the server/database configuration as shown in FIG. 2. In FIG. 2, the different entities are illustrated by some of the equipment that may be used by that entity.

Unlike the data processing system for user 12, the data processing system of user 22 includes a data processing system program product that allows the user 22 to have his or her activities with respect to electronic sites recorded, as will be explained in more detail later. The data processing system program product of user 22 typically includes code embodied within a data processing system readable medium. The code includes instructions executable by a data processing system for carrying out at least one method.

In one specific implementation, the data processing system program product may be a plug-in for a browser program. Before being loaded, the plug-in may reside within a hard disk, CD-ROM, floppy diskette, or other nonvolatile memory within the data processing system of the user 22. During or after the browser program is launched, the plug-in is loaded into the random access memory or other similar volatile memory within data processing system of the user 22. Each of the memories mentioned within this paragraph includes a data processing system readable medium. The data processing system program product is not limited to a plug-in for a browser program. The data processing system program product can be part of the browser program (not a separate plug-in), a different software application, an operating system, or the like.

Many variables are possible with the code of the data processing system program product. In one embodiment, the code may include instructions where information related to view requests is always sent (cannot be disabled unless code is removed or altered). In another embodiment, the code may include instructions to allow the user 22 to determine whether the information is to be sent. The data processing system program product may have code for a user 22 to select a first mode of operation or a second mode of operation. The first mode of operation may be to enable (activate) sending the information to the user information system 28, and the second mode of operation may be to disable (deactivate) sending the information to the user information system 28. Even if the first mode of operation is activated, the user 22 is not sent a view solely in response to the information being sent to the user information system 28.

The selection of the different modes may be achieved by a pull-down menu in the browser program, buttons as part of a graphical user interface, a separate screen for reconfiguring the settings, or the like. Depending on the product, the browser program may or may not need to be relaunched for the changes to take effect. The change may be permanent until the user 22 modifies the configuration, or the code may be configured to return to the original default when the browser program is closed and later relaunched. Clearly, the product could be configured with an opposite default (i.e., normally disabled). The use of the product is better understood in conjunction with the description of the method illustrated in FIG. 3.

Figure 3:
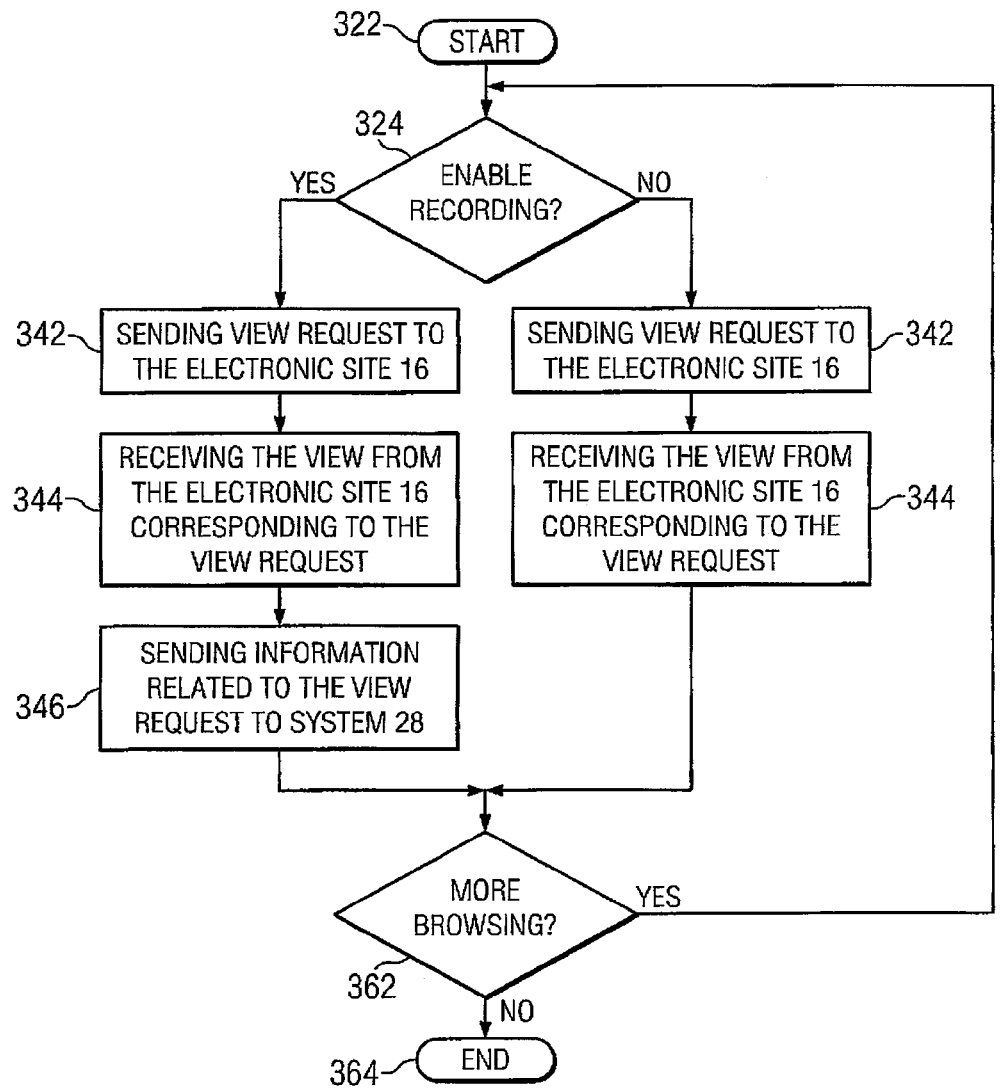
FIG. 3 includes a flow diagram for a method of using the system in FIG. 2.

FIG. 3 includes a process flow diagram for a method of using the system illustrated in FIG. 2. For this example, the data processing system program product as described in the preceding paragraph has a user selectable function. The user 22 starts (oval 322) by making a decision whether the user 22 should enable the recording function of the product (diamond 324). Regardless whether recording is enabled (the "YES" branch from diamond 324) or disable (the "NO" branch from diamond 324), the method proceeds with the acts of the user 22 sending a view request to the electronic site 16 (block 342) and receiving from the electronic site 16 a view substantially corresponding to the view request (block 344). The request is typically in the form of an HTTP request for a Universal Resource Locator (URL). Some advertising or additional information may be sent with the view; however, most of the view comes from electronic site 16 in response to the view request from the user 22. These acts are similar to those performed by users with conventional browser programs.

Unlike conventional browser programs, the product may allow recording of information related to the view request. Referring to the "YES" branch from diamond 324), the user sends information related to the view request to user information system 28 (block 346). The information can include site information related to the view request (e.g., the URL or the like), an identifier of the user 22 (e.g., Internet Protocol address, pre-assigned user identifier, a cookie, or the like), temporal information related to the view request (e.g., time stamp, time-at-view, or the like), or the like. The entity that substantially controls or owns the user information system 28 is usually different from the entities that substantially control or own the ESAP 14 or the electronic site 16. In one specific implementation, the information may be sent to the user information system 28 via the ESAP 14 as shown in FIG. 2 (the ESAP 14 forwards the information received from the user 22 to the user information system 28). The server 282 receives the information and records it within the database 284. If the optional server 282 is not used, the ESAP 14 may record information within database 284.

Returning to FIG. 3, the timing for sending of information in act 346 is variable. The information could be sent at substantially the same time as act 342 or 344, between the acts, or after the acts. To capture as much information as possible, the information may be send (block 346) every time a request for a view is made (block 342). Alternatively, information may only be collected for electronic sites that exist. In the latter instance, the database may not record error messages for views not found or displayed with respect to the user. In another embodiment, the information may be sent (block 346) before sending the view request (block 342). In yet another embodiment, information may be accumulated by the user 22 and sent to the system 28 after a predetermined volume of data has accumulated or on a periodic (e.g., daily, weekly, or the like) basis. While the data may not be as current as other embodiments, this method should reduce the work of the ISP 14 by reducing the number of transmissions of information to the system 28. Many other different timing schemes can be used.

Regardless which path is used in FIG. 3, the user 22 determines whether more browsing is desired (diamond 362). If not, the method ends (oval 364). Otherwise, the method returns to decision diamond 324. For the subsequent view request, the user may change the configuration. For example, during the first view request, the recording may have been enabled. Before a second view request, the user 22 disables recording. The acts 342 and 344 are performed, but in this instance, the user 22 does not send information related to the second view to anyone (i.e., the act listed in block 346 is not performed), and more specifically, not to user information system 28. This feature allows the user to decide whether he or she wants others to build a user profile based on any or all of his or her activities at the electronic sites. The user 22 can maintain the level of privacy that the user 22 desires.

Privacy issues and selection of the mode of operation (enable versus disable) for recording by the user 22 can depend on the identity of the various entities. Typically, the data processing system of user 22, the ESAP 14, the electronic site 16, and user information system 28 are not significantly or substantially controlled or owned by a single entity. In many instances, an entity does not significantly or substantially control or own more than one of the data processing systems of the user 22, the ESAP 14, the electronic site 16, and the user information system 28. However, the server 282 and database 284 are substantially controlled or owned by a single entity in most instances. Note that one of the entities may control or own part of a different entity, but such control or ownership is typically not significant (less than approximately 10% ownership of the different entity or less than approximately 10% ownership of the voting shares of the different entity). These various scenarios are not meant to prevent an entity from substantially controlling or owning one, two, three, or all four of the data processing systems of the user 22, the ESAP 14, the electronic site 16, and the user information system 28.

The entity that substantially controls or owns the user information system 28 may use the information collected or obtained as that entity deems appropriate. The entity may allow the user 22 to access his or her information. In one embodiment, the user 22 may send and the system 28 may receive an inquiry for at least some of the information collected on that user 22. In response to the request, the system 28 may send and the user would receive information regarding that the user 22 that substantially corresponds to the inquiry.

The system 28 may also be configured in a hierarchical manner, such that user 22, who has a higher priority, can obtain information on all or a portion of other users having a lower priority. In still other embodiments, the entity that substantially controls or owns the system 28 may provide a commercial service that sells part or all the information within database 284 to others, such as an entity that substantially controls or owns the electronic site 16. Although not shown, the electronic site 16 and the system 28 may be bidirectionally coupled to each other. The electronic 16 may access the system 28 to determine the content of advertising or other similar information that may be sent user 22. This content may be sent as part of the view or sent separately to the user 22.

The systems and methods described above allow a more accurate user profile to be achieved compared to information collected on a user only at an electronic site or only at electronic sites that are part of an alliance. The ability to enable/disable recording allows the user 22 to let most of his or her activities at electronic sites be recorded while not having all activities recorded. The user 22 may want activities not recorded where the user 22 might be harmed if knowledge of such activity would become publicly available.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A computer-implemented method of tracking user activity on a website in a manner that is responsive to user tracking selections, comprising:

responsive to a user selection of a first mode of operation to track website activity related to the user, enabling, by a data processing system program product embodied on non-transitory computer memory of a data processing system of the user, the sending of information related to website activity of the user on a website;

the data processing system of the user sending a view request to a website server serving the website and receiving from the website server a view substantially corresponding to the view request regardless of whether the sending of information is enabled by the data processing system program product embodied on the data processing system of the user;

the data processing system of the user sending the information related to the website activity of the user on the website to an electronic site access provider server;

the electronic site access provider server storing or causing the storing of the information related to the website activity of the user on the website in a user information system; and responsive to another user selection of a second mode of operation, the data processing system program product embodied on the data processing system of the user disabling the sending of the information related to the website activity of the user on the website.

2. The computer-implemented method according to claim 1, further comprising, in said first state, generating, by a website tracking server of the user information system, a user profile based on the stored website activity information, said user profile related to website activity for which the user enables tracking.

3. The computer-implemented method according to claim 1, wherein said stored information related to website activity of the user in said first mode of operation is publicly available and website activity of the user in said second mode of operation is not publicly available thereby serving to protect the privacy of website activity of the user in said second mode of operation.

4. The computer-implemented method according to claim 1, wherein said stored information includes information on a plurality of users and is publicly available on a basis of a priority wherein a user with a higher priority can obtain information on other users with a lower priority.

5. The computer-implemented method according to claim 1, wherein the website activity of the user comprises information related to a view request.

6. The computer-implemented method according to claim 5, wherein the view request comprises temporal information.

7. The computer-implemented method according to claim 1, wherein the user information system is independent of the website server.

8. The computer-implemented method according to claim 1, wherein the electronic site access provider server stores the information in a database of the user information system.

9. The computer-implemented method according to claim 1, wherein the electronic site access provider server sends the information to a website tracking server of the user information system, wherein the website tracking server stores the information in a database of the user information system.

10. A computer program product including at least one non-transitory computer readable medium storing instructions translatable by at least one processor to perform:
responsive to a user selection of a first mode of operation to track website activity related to the user, enabling, by a data processing system program product embodied on a data processing system of the user, the sending of information related to website activity of the user on a website;
the data processing system of the user sending a view request to a website server serving the website and receiving from the website server a view substantially corresponding to the view request regardless of whether the sending of information is enabled by the data processing system program product embodied on the data processing system of the user;
the data processing system of the user sending the information related to the website activity of the user on the website to an electronic site access provider server;
the electronic site access provider server storing or causing the storing of the information related to the website activity of the user on the website in a user information system; and
responsive to another user selection of a second mode of operation, the data processing system program product embodied on the data processing system of the user disabling the sending of the information related to the website activity of the user on the website.

11. The computer program product of claim 10, wherein the at least one non-transitory computer readable medium stores further instructions translatable by the at least one processor to perform:
in said first mode of operation, generating, by a website tracking server of the user information system, a user profile based on the stored website activity information, said user profile related to website activity for which the user enables tracking.

12. The computer program product of claim 10, wherein said stored information related to website activity of the user in said first mode of operation is publicly available and website activity of the user in said second mode of operation is not publicly available thereby serving to protect the privacy of website activity of the user in said second mode of operation.

13. The computer program product of claim 10, wherein said stored information includes information on a plurality of users and is publicly available on a basis of a priority wherein a user with a higher priority can obtain information on other users with a lower priority.

14. The computer program product of claim 10, wherein the website activity of the user comprises information related to a view request.

15. The computer program product of claim 14, wherein the view request comprises temporal information.

16. The computer program product of claim 10, wherein the user information system is independent of the website server.

17. The computer program product according to claim 10, wherein the electronic site access provider server stores the information in a database of the user information system.

18. The computer program product according to claim 10, wherein the electronic site access provider server sends the information to a website tracking server of the user information system, wherein the website tracking server stores the information in a database of the user information system.

19. A system for tracking user activity on a website in a manner that is responsive to user tracking selections, comprising:
at least one processor;
at least one non-transitory computer readable medium storing instructions translatable by the at least one processor to perform:
responsive to a user selection of a first mode of operation to track website activity related to the user, enabling, by a data processing system program product embodied on a data processing system of the user, the sending of information related to website activity of the user on a website;
the data processing system of the user sending a view request to a website server serving the website and receiving from the website server a view substantially corresponding to the view request regardless of whether the sending of information is enabled by the data processing system program product embodied on the data processing system of the user;
the data processing system of the user sending the information related to the website activity of the user on the website to an electronic site access provider server;
the electronic site access provider server storing or causing the storing of the information related to the website activity of the user on the website in a user information system; and
responsive to another user selection of a second mode of operation, the data processing system program product embodied on the data processing system of the user disabling the sending of the information related to the website activity of the user on the website.

20. The system of claim 19, wherein the at least one non-transitory computer readable medium stores further instructions translatable by the at least one processor to perform:

in said first mode of operation, generating, by a website tracking server of the user information system, a user profile based on the stored website activity information, said user profile related to website activity for which the user enables tracking.

21. The system of claim 19, wherein said stored information related to website activity of the user in said first mode of operation is publicly available and website activity of the user in said second mode of operation is not publicly available thereby serving to protect the privacy of website activity of the user in said second mode of operation.

22. The system of claim 19, wherein said stored information includes information on a plurality of users and is publicly available on a basis of a priority wherein a user with a higher priority can obtain information on other users with a lower priority.

23. The system of claim 19, wherein the website activity of the user comprises information related to a view request.

24. The system of claim 23, wherein the view request comprises temporal information.

25. The system of claim 19, wherein the user information system is independent of the website server.

26. The system according to claim 19, wherein the electronic site access provider server stores the information in a database of the user information system.

27. The system according to claim 19, wherein the electronic site access provider server sends the information to a website tracking server of the user information system, wherein the website tracking server stores the information in a database of the user information system.

\* \* \* \* \*